Patented Aug. 14, 1951

2,564,380

UNITED STATES PATENT OFFICE 2,564,380

SULFUR COLORS OF THE DIOXAZINE SERIES

Otto Stallmann, Bridgeton, N. J., and Gordon Bradbury Robbins, Claymont, Del., assignors to E. I. du Pont de Nemours & Company, Wilmington, Del., a corporation of Delaware No Drawing. Application June 22, 1949,
Serial No. 100,745

2 Claims. (Cl. 260—128)

This invention relates to novel sulfur colors and to a method of preparing the same. For the purpose of this invention, a "sulfur color" may be defined as one soluble in aqueous sodium sulfide, and capable of being applied to fabric by the standard sulfur dye procedure, that is by vatting in an aqueous sodium-sulfide bath, followed by oxidation on the fiber to the insoluble form.

It is known that sulfur dyes are relatively scarce in those portions of the spectrum ranging from orange, through red, to violet. On the other hand, sulfur dyes generally possess the advantages of being easily reducible, hence easily applicable to textile material, and of yielding furthermore, dyeings of good fastness qualities.

Accordingly, it is an object of this invention to produce new sulfur colors of good tinctorial qualities and of desirable shades, especially in the ranges of blue to red and red to orange. Further important objects of this invention will become apparent as the description proceeds.

Sulfur dyes in general possess properties which make them very desirable for commercial purposes. Outstanding among these properties, aside from their low cost, is their relative ease and economy of application. Thus, whereas anthraquinone vat dyes demand relatively expensive reducing agents (sodium hydrosulfite) and careful control of dyeing conditions in order to obtain level dyeings, sulfur dyes are reduced easily by cheap reagents (sodium sulfide) to give level dyeings with a minimum amount of attention to conditions of application. The dyeings from sulfur dyes, though not so fast to light and bleach as the anthraquinone vat dyes, are nearly as fast to washing. The light fastness of sulfur dyes is very good, however, compared to azo dyes, and their wash fastness is much superior to that group. Thus, sulfur dyes answer a definite need for inexpensive dyes of moderately good light fastness combined with very good wash fastness. Finally sulfur colors are generally marketed in powder form which dissolves readily in the sodium sulfide vat; hence, sulfur colors are convenient to transport and to store.

It is clear from the aforegoing considerations that the lack of sulfur colors in certain ranges of the spectrum constitutes a practical want of great commercial significance. It is not merely that the absence of a sulfur red, for instance, deprives the textile manufacturer of the privilege of producing red dyed textiles by the aid of sulfur dyes. But even of greater commercial significance is the fact that the textile dyer is handicapped when he desires to shade available sulfur colors in the direction of red.

Thus, textile dyers, as a rule, do not find it convenient to limit their production to colors or shades available by the marketed dyestuffs of a given class (say sulfur colors). More often, the artist's design calls for the use of a color which is a shade different, one way or another, from a given standard product. To meet the requirement, the given color has to be shaded with another color.

Furthermore, when it is desired to shade say a blue into a reddish-blue, the obvious expedient of adding a red color to the blue is not in practice the best, inasmuch as the brightness of the color may suffer from mixing such diverse shades. A more practical expedient is to shade the blue with a violet; in other words, it is preferable to have the shading color as near as possible to the principal color, so as to avoid undue dullness in the resulting mixture.

The production of sulfur colors which would fill out the missing ranges in the spectrum thus becomes an economic problem not only on its own merit, but also because it would enhance the utility of those ranges of the spectrum which are now available in this field. In spite of its importance, however, this problem has not to our knowledge been solved to date. Red shades in sulfur colors have come to be looked upon by experts as an almost unattainable ideal, while the neighboring ranges of orange and violet have been but poorly satisfied in the art to date.

To the extent that allusion to such colors may be found in the literature, they either require expensive initial materials or complex processes of production, or the resulting color is dull or of very low tinctorial power, making the color highly uneconomical for practical use.

In the copending application of one of us, Serial No. 53,385 (Patent No. 2,504,153, issued April 18, 1950), is described a method for producing sulfur colors of the dioxazine series by reacting upon dioxazine colors with a special sulfurizing agent comprising the complex addition product of aluminum chloride and sulfur monochloride. This method is excellent for its simplicity and economy, but offers no opportunity for determining in advance the exact shade of the resulting sulfur dye. In many instances the sulfurization affects the shade of the original triphendioxazine color to such an extent that the resulting sulfur dye is of a distinctly different shade.

Our present invention is based on the discovery that if an amide linkage such as —CO—NH— or —CO—N(CH$_3$)— is interposed between the principal triphendioxazine complex and the nucleus bearing the sulfide-vattable group, the disturbing influence of the latter upon the shade of the compound is eliminated, and the sulfur dye obtained will give dyeings almost identical in shade with those obtainable from the original triphendioxazine compound.

Accordingly, our present invention comprises a new series of dyestuffs characterized by the general formula

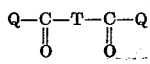

wherein T represents a triphendioxazine radical, while Q represents the radical of an amine selected from the group consisting of primary and secondary aromatic amines of the benzene, naphthalene and diphenyl series which are free of water-solubilizing groups but bear in the aromatic nucleus a sulfide-vattable group, Q being attached to the $$\begin{array}{c} C \\ \parallel \\ O \end{array}$$

group through the N-atom of its amine group.

To illustrate, the radical Q may stand for

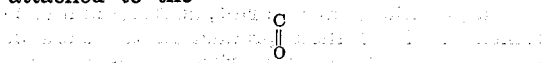

from amino-diphenyl;

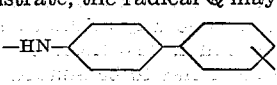

from 4-thiocyano-aniline or from p,p'-diamino-diphenyl-disulfide;

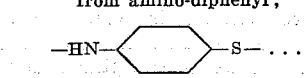

from N-methyl-4-thiocyano-aniline;

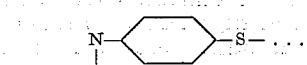

from alpha-naphthylamine; etc.

The triphendioxazine complex T may be defined by the general formula

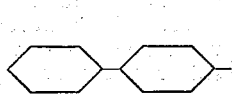

wherein X stands for hydrogen, halogen or methyl.

The new compounds may be prepared by starting with a compound having aromatic radicals linked through an amido-linkage to a triphendioxazine complex T, as above defined, and lacking only the sulfide-vattable groups. This compound is then thionated in any convenient manner, for instance by treating with an aluminum-chloride sulfur-monochloride complex according to U. S. P. 2,369,666. Or they may be prepared synthetically, by reacting a triphendioxazine-dicarboxylic acid with an aromatic amine having a sulfide-vattable group, according to copending application of G. B. Robbins of even date herewith (Serial No. 100,746).

In the latter case, the sulfide-vattable group in the initial aromatic amine may be a thiocyano group (SCN), a xanthate group (S—CS—O alkyl) or a polysulfide link (—S— . . . —S—). In the case of the procedure involving thionation, the form and orientation of the entering sulfide-vattable radical is not known with certainty. But when reduced in the dye-vat (with sodium sulfide) followed by oxidation on the fiber, the sulfide-vattable group assumes in all cases the disulfide form. Therefore, all sulfide-vattable groups may be represented symbolically by —S— . . . , as in the above formulas.

Our novel compounds are characterized by being soluble in aqueous sodium sulfide, being substantive to cotton from such solution, and being convertible into fast dyeings on the fiber after exposure to air or oxidation in the manner customary with sulfur dyes.

Without limiting our invention, the following examples are given to illustrate the several possible modes of preparing them. Parts mentioned are by weight.

*Example*

162 parts of sulfur monochloride and 80 parts of anhydrous aluminum chloride are stirred together for several hours at 80°–100° C., until a liquid complex reaction product is formed.

10 parts of 4-amino-diphenyl and 12 parts of 3-nitro-4-methoxy-benzoic acid are condensed by the aid of thionyl chloride to the corresponding amide, and the nitro group is then reduced with sodium hydrogen sulfide to the amine stage. 6.5 parts of the latter are then condensed with 2.3 parts of chloranil according to U. S. P. 2,092,387, through an intermediate diaryl-aminoquinone compound, to a dioxazine compound of the structure

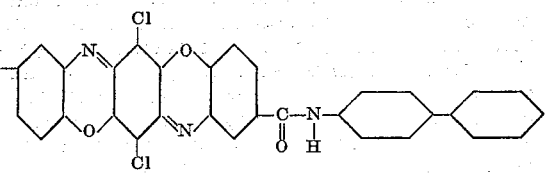

10 parts of this dioxazine and 175 parts of the above aluminum-chloride-sulfur-monochloride complex are then reacted together at 75° to 80° C. for one half hour. The mixture is drowned in 1000 parts of ice water containing 50 parts of hydrochloric acid, and is stirred until the excess of the sulfurizing complex is decomposed. The drowned mass is filtered, and the filter cake is washed with water to remove most of the acid and salts. The material is then extracted with 1500 parts of water at 80° to 90° C., adding caustic soda to hold slight alkalinity on Clayton Yellow paper until most of the sulfur (which has formed in the decomposition step) is dissolved. The dye is then filtered off, washed alkali-free, and dried at 70° to 80° C.

The product can be vatted and dyed with sodium sulfide by procedures normally used in the application of sulfur colors. It dyes cotton in reddish-orange shades.

In the above product, the CONH groups are located in the positions 3, 10 of the triphendioxazine complex. By following an analogous procedure, the corresponding 2,9-isomer may be prepared. The resulting sulfur dye gives on cotton a pink shade.

We claim as our invention:

1. A process for producing sulfur dyestuffs of reddish shades, which comprises reacting with an aluminum-chloride-sulfur-monochloride complex corresponding to the formula $AlCl_3.2S_2Cl_2$ upon a dyestuff of the triphendioxazine series corresponding to the formula

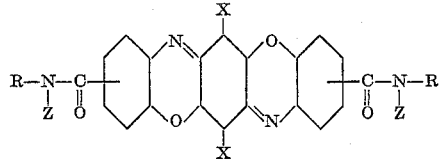

wherein X stands for hydrogen, halogen or methyl, Z stands for hydrogen or methyl, and R designates an aromatic hydrocarbon radical, whereby to introduce sulfur-vattable groups into the radical R.

2. The sulfur dyestuffs obtained by the process defined in claim 1.

OTTO STALLMANN.
GORDON BRADBURY ROBBINS.

REFERENCES CITED

The following references are of record in the file of this patent:

UNITED STATES PATENTS

| Number | Name | Date |
|---|---|---|
| 2,369,666 | Fox | Feb. 20, 1945 |

FOREIGN PATENTS

| Number | Country | Date |
|---|---|---|
| 509,898 | Great Britain | of 1939 |